(12) United States Patent
Shin

(10) Patent No.: US 7,241,018 B2
(45) Date of Patent: Jul. 10, 2007

(54) EXHAUST DEVICE OF IMAGE DISPLAY

(75) Inventor: Jong Hoon Shin, Youngju-si (KR)

(73) Assignee: LG Electronics Inc., Seoul (KR)

(*) Notice: Subject to any disclaimer, the term of this patent is extended or adjusted under 35 U.S.C. 154(b) by 224 days.

(21) Appl. No.: 11/024,934

(22) Filed: Dec. 30, 2004

(65) Prior Publication Data

US 2005/0140935 A1 Jun. 30, 2005

(30) Foreign Application Priority Data

Dec. 30, 2003 (KR) .................. 10-2003-0100079

(51) Int. Cl.
*G03B 21/16* (2006.01)
*H04N 5/64* (2006.01)

(52) U.S. Cl. .................. 353/119; 353/74; 348/794; 348/789

(58) Field of Classification Search .............. 353/52, 353/57–61, 47, 74–78, 119; 348/794, 787–789, 348/748; 359/460, 456
See application file for complete search history.

(56) References Cited

U.S. PATENT DOCUMENTS

| | | | |
|---|---|---|---|
| 6,254,238 B1* | 7/2001 | Takamatsu | 353/61 |
| 6,561,655 B2* | 5/2003 | Onishi et al. | 353/61 |
| 6,641,267 B2* | 11/2003 | Ohishi et al. | 353/61 |
| 6,957,892 B2* | 10/2005 | Kuroda | 353/61 |
| 2001/0022650 A1* | 9/2001 | Ono | 353/52 |
| 2004/0125343 A1* | 7/2004 | Hara et al. | 353/57 |

* cited by examiner

*Primary Examiner*—W. B. Perkey
*Assistant Examiner*—Andrew T Sever
(74) *Attorney, Agent, or Firm*—Ked & Associates, LLP

(57) ABSTRACT

An exhaust device of an image display is provided. The exhaust device includes a supporter and an exhaust cover. The supporter is connected to and supported by a back cover of the image display, and is protruded toward an inside of the image display, and has openings formed thereat forming an exhaust channel. The exhaust cover is connected to and supported by the supporter, and is formed on the exhaust channel so that the exhaust channel is diverged into plural directions.

20 Claims, 8 Drawing Sheets

EXHAUST DEVICE OF IMAGE DISPLAY

BACKGROUND OF THE INVENTION

1. Field of the Invention

The present invention relates to an exhaust device of an image display, and more particularly, to an exhaust device of an image display, which exhausts heat generated in the image display from the image display.

2. Description of the Related Art

In general, a projection TV (television) is a sort of an image display, which projects an image generated by an optical engine equipped with a projection lens on a wide screen through a reflection mirror to thereby display a screen image larger than an original image.

FIG. 1 is a schematic view of a prior art projection TV.

Referring to FIG. 1, a projection TV 1 is constructed to include an optical engine 2 for forming an image, a projection lens 3 for enlarging and projecting the formed image, a reflection mirror 4 for reflecting the enlarged and projected image at a given angle, and a screen 5 for displaying the reflected image.

The screen 5 is fixed to a front cabinet 7, and the reflection mirror 4 is fixed to a back cover 6 with it being inclined at a given angle with respective to the back cover 6.

The back cover 6 and the front cabinet 7 form a housing structure of the projection TV 1.

When an image signal and a power source are applied to the above-constructed projection TV 1, it forms an image through the optical engine 2 and projects the formed image light through the projection lens 3 onto the reflection mirror 4.

Thereafter, the projected image light is reflected by the reflection mirror 4, and the reflected image light is projected onto the screen whereby a screen image is displayed.

In the meantime, FIG. 2 illustrates a lamp of the optical engine 2 and a heat-exhausting structure thereof in the prior art projection TV, and FIG. 3 illustrates an exhaust cover in the prior art projection TV.

A lamp 21 of the optical engine 2 is installed at a lamp housing 23, and a cooling fan 8 for exhausting heat generated by the lamp 21 from the projection TV is installed at one side of the lamp housing 23.

Also, an exhaust cover 9 is formed in an opening 61 of the back cover 6 facing the cooling fan 8.

A plurality of cover plates 91 inclined at a given angle and spaced apart from one another by a given space are installed in the exhaust cover 9. Here, the inclined angle of the cover plates 91 is for preventing interior light from being emitted outside.

Also, the space between the cover plates 91 forms an exhaust channel for emitting interior heat outward.

However, the exhaust cover 9 has a drawback in that the plurality of the cover plates 91 constituting the exhaust cover 9 increase resistance against air flow generated by the cooling fan 8 to thereby decrease a cooling efficiency of the cooling fan 8 and induce noises.

Moreover, the exhaust cover 9 has another drawback in that light generated at the lamp 21 leaks through the space between the cover plates 91, which causes users' dissatisfaction.

SUMMARY OF THE INVENTION

Accordingly, the present invention is directed to an exhaust device of an image display that substantially obviates one or more problems due to limitations and disadvantages of the related art.

An object of the present invention is to provide an exhaust device of an image display, which can smooth flow of exhaust air in the image display and minimize noises generated therein.

Another object of the present invention is to provide an exhaust device of an image display, which can prevent the light of a lamp from leaking outside of the image display.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an exhaust device of an image display includes: a supporter connected to and supported by a back cover of the image display, protruded toward an inside of the image display, and having openings formed thereat forming an exhaust channel; and an exhaust cover connected to and supported by the supporter, and formed on the exhaust channel so that the exhaust channel is diverged into plural directions.

In another aspect of the present invention, an exhaust device of an image display includes: a supporter connected to and supported by a back cover of the image display, and having inner and outer openings formed thereat to thereby form an exhaust channel; and an exhaust cover connected to and supported by the supporter, and having a guide surface formed therein, the guide surface facing the supporter and extended from the inner opening to the outer opening.

In a further another aspect of the present invention, an exhaust device of an image display includes: a supporter having one end and the other end and a connection part, the one end forming an inner opening facing a cooling fan installed at the image display, the other end being fixed to a back cover of the image display to thereby form an outer opening, the connection part being supported by a support rib extended from the inner opening; and an exhaust cover connected to the supporter, an occupation area of the exhaust cover on the exhaust channel becoming larger as the exhaust cover's position is moved from the inner opening to the outer opening, so that exhaust air emitted through the inner opening to the outer opening is emitted to an peripheral part of the outer opening.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
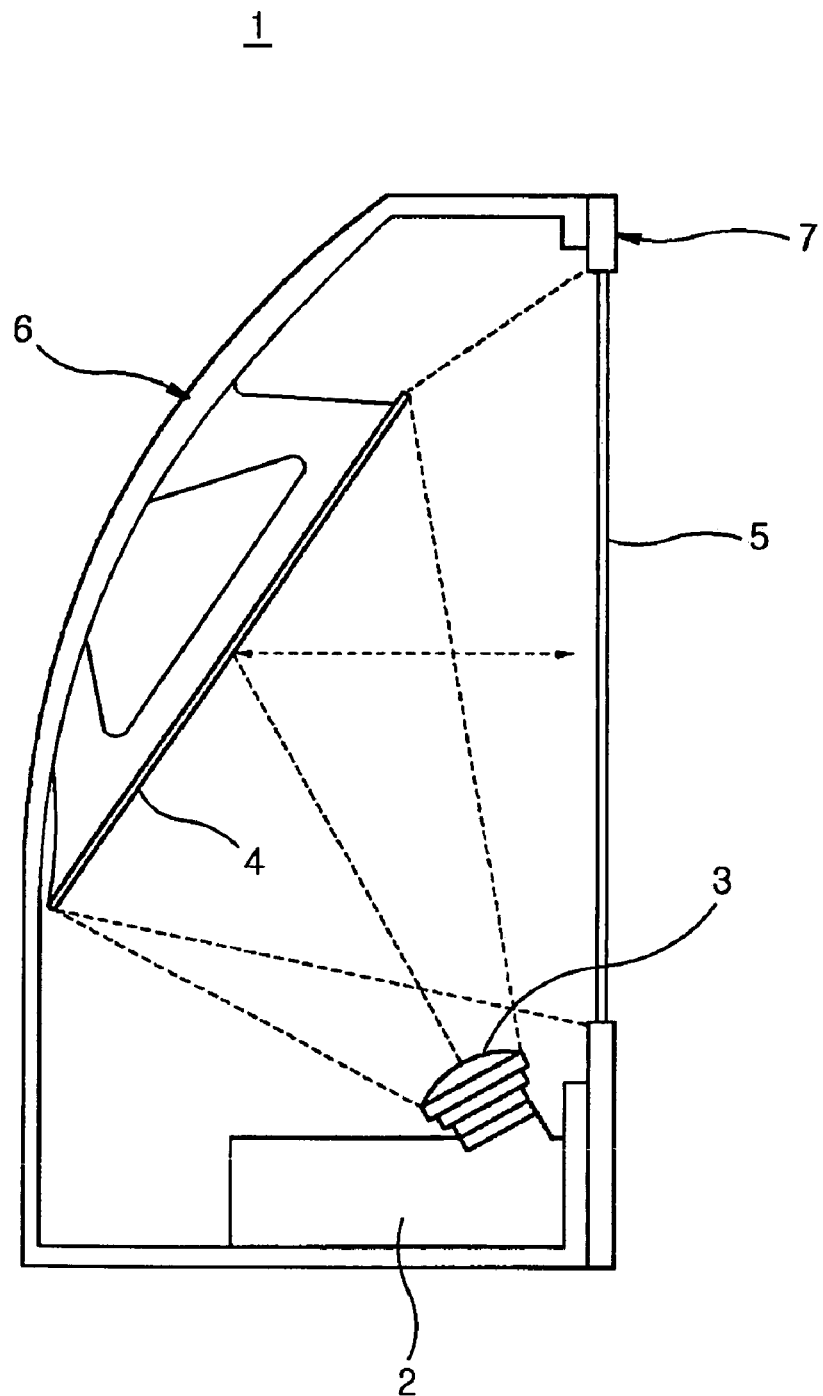
FIG. 1 is a schematic view of a prior art projection TV.
Figure 2:
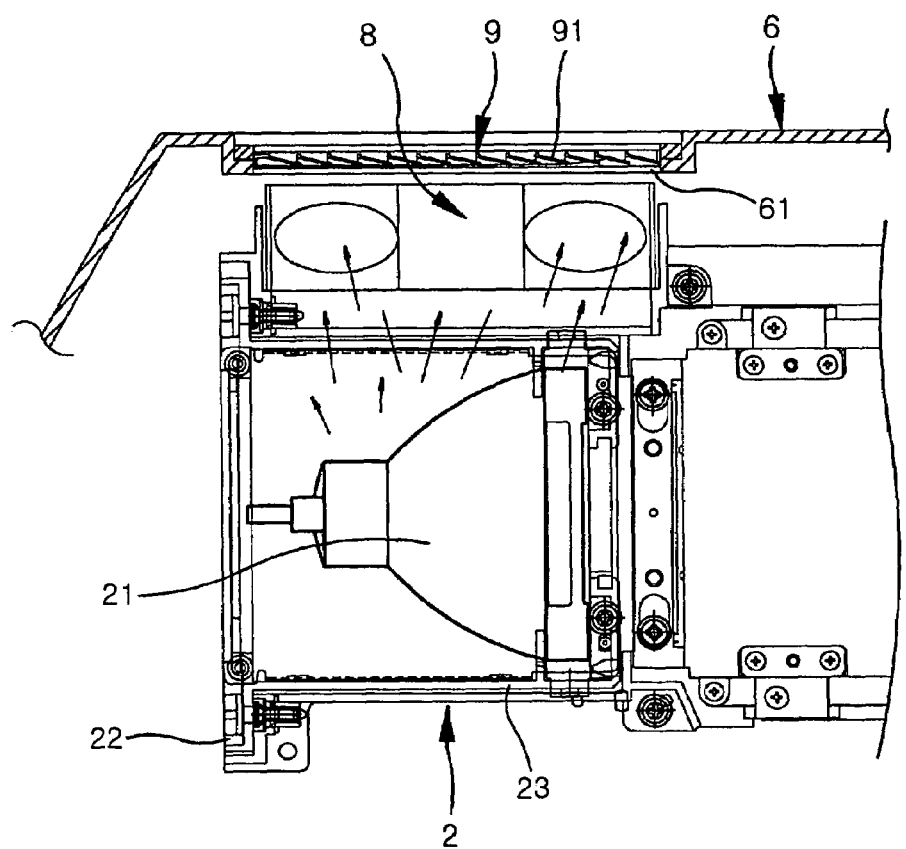
FIG. 2 is a view illustrating a lamp of an optical engine and a heat-exhausting structure thereof in the prior art projection TV.
Figure 3:
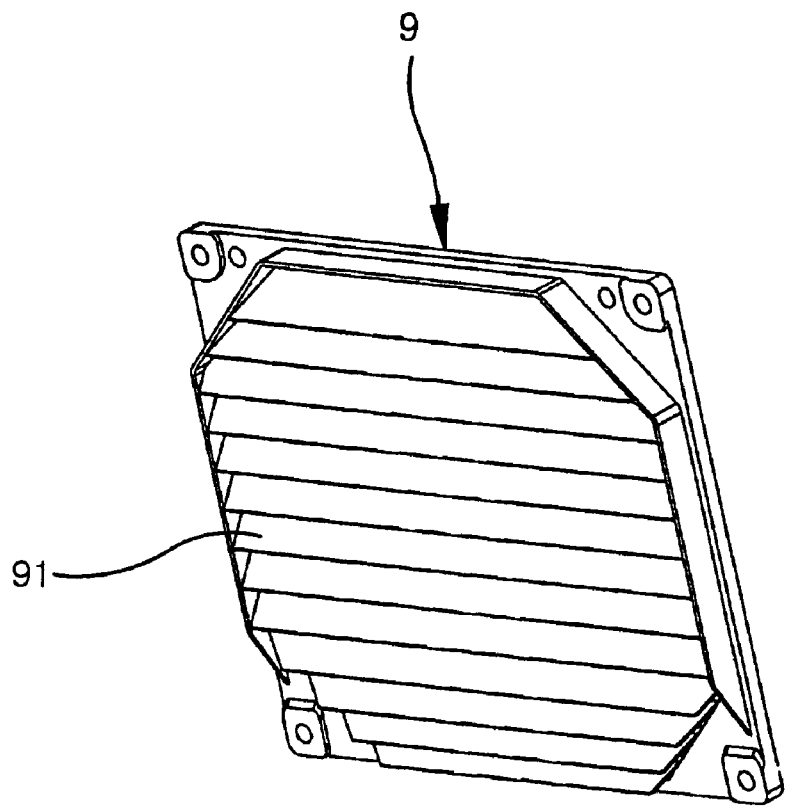
FIG. 3 is a view illustrating a prior art exhaust cover.
Figure 4:
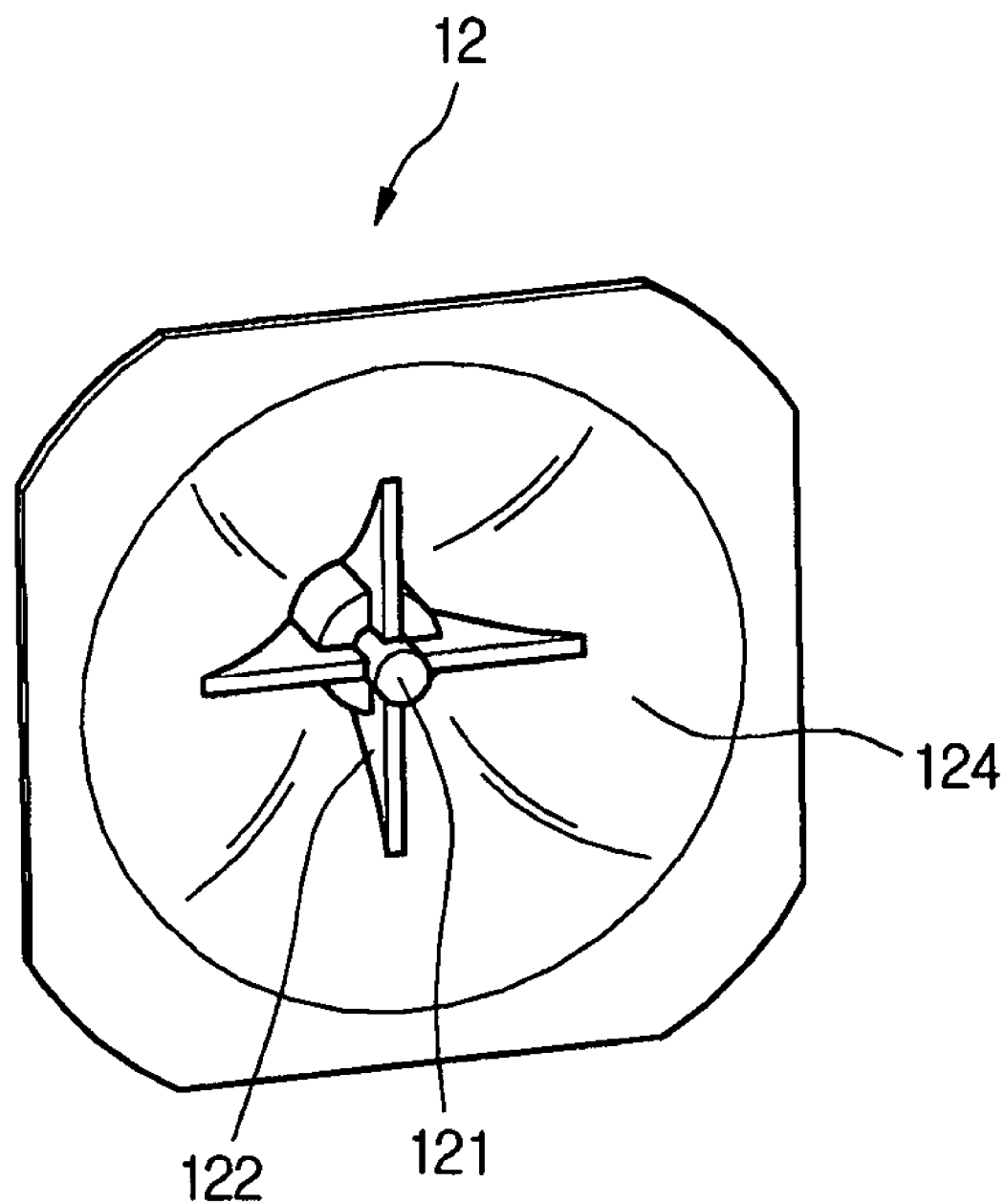
FIG. 4 is a view illustrating an exhaust cover in an exhaust device of an image display according to an embodiment of the present invention.
Figure 5:
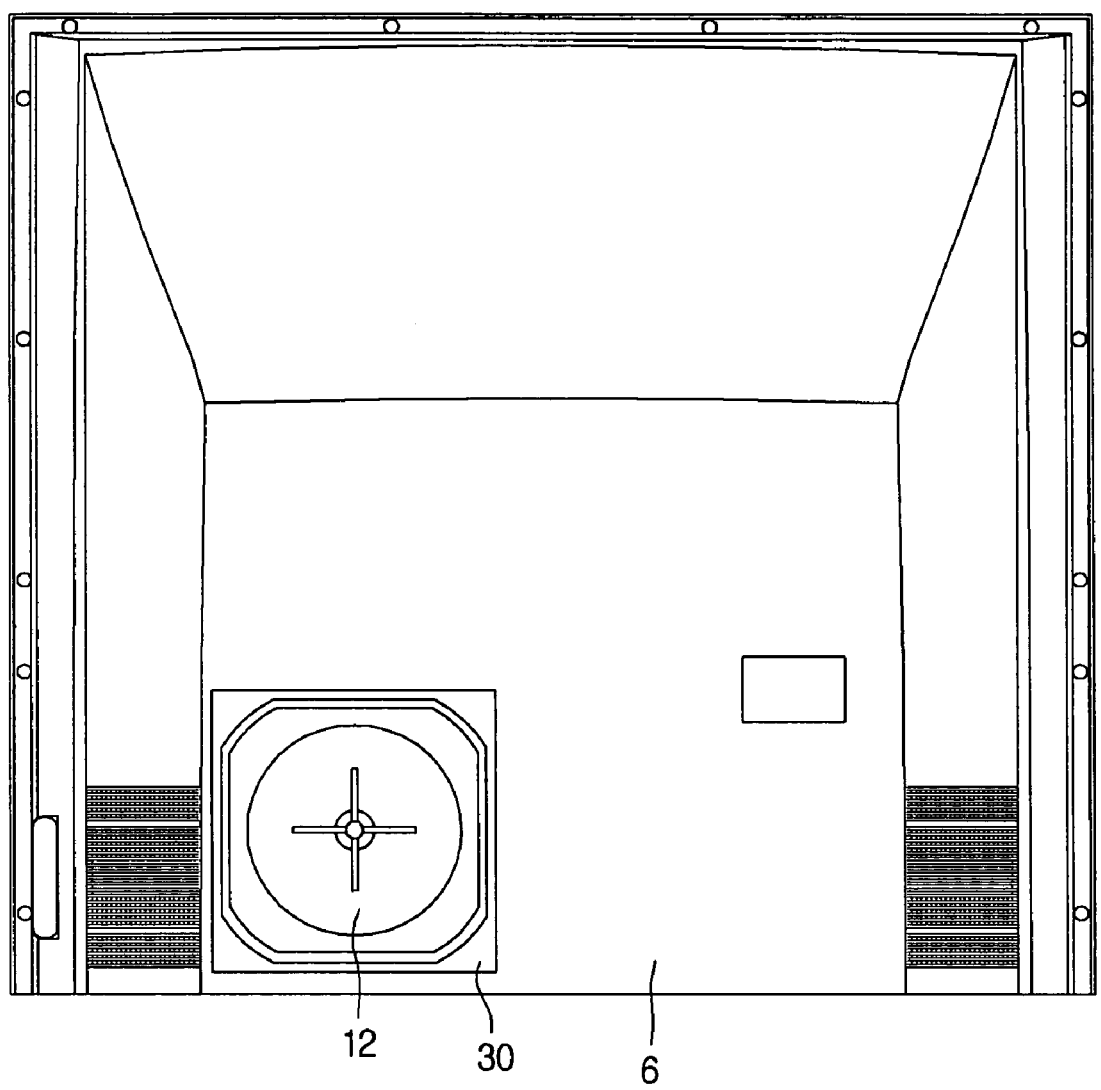
FIG. 5 is a view illustrating an exhaust cover installed at a back cover in an exhaust device of an image display according to an embodiment of the present invention.

FIG. 4 illustrates an exhaust cover in an exhaust device of an image display according to an embodiment of the present invention, and FIG. 5 illustrates an exhaust cover installed at a back cover in an exhaust device of an image display according to an embodiment of the present invention.

Figure 6:
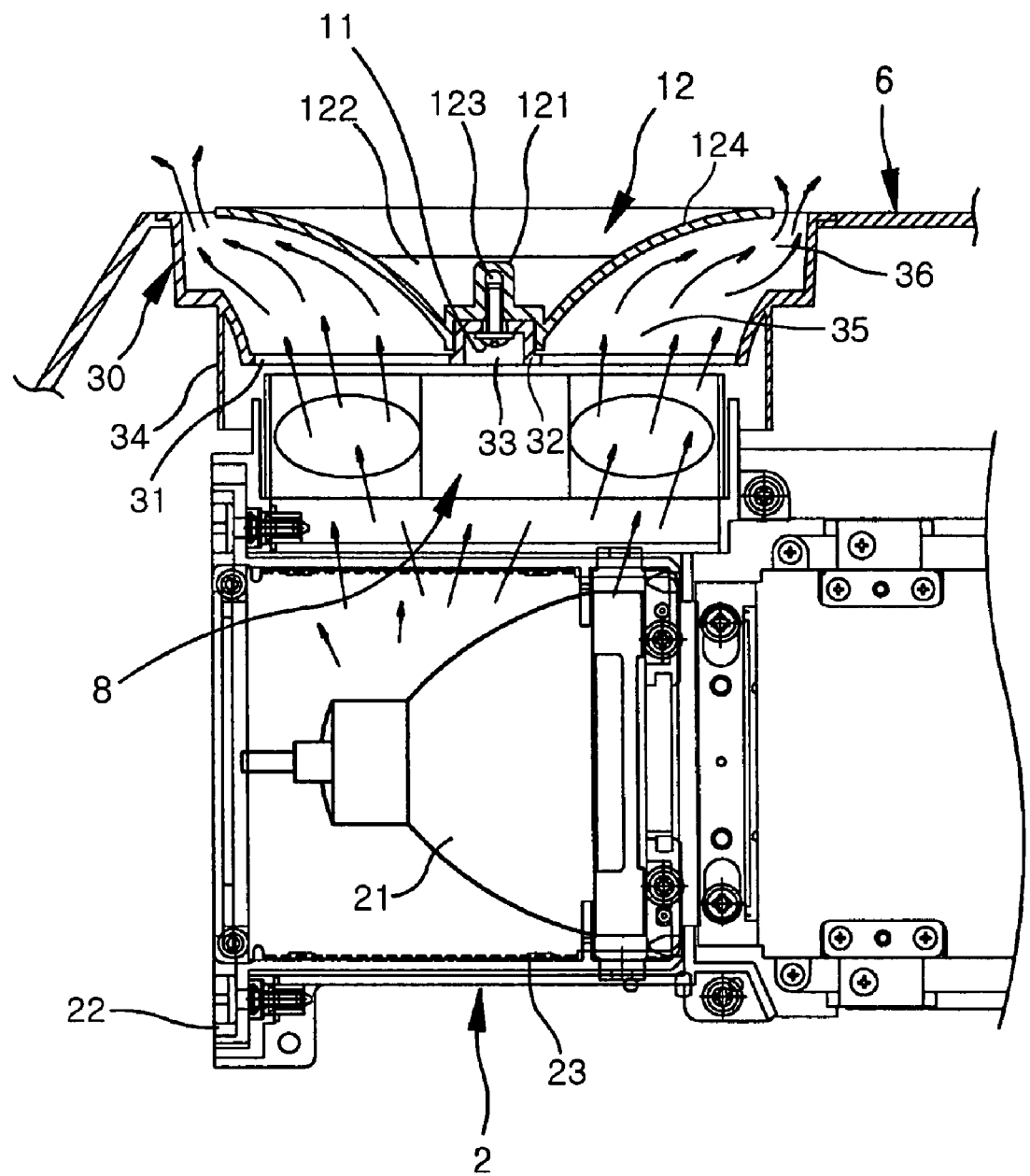
FIG. 6 is a sectional view of an exhaust device of an image display according to an embodiment of the present invention.
Figure 7:
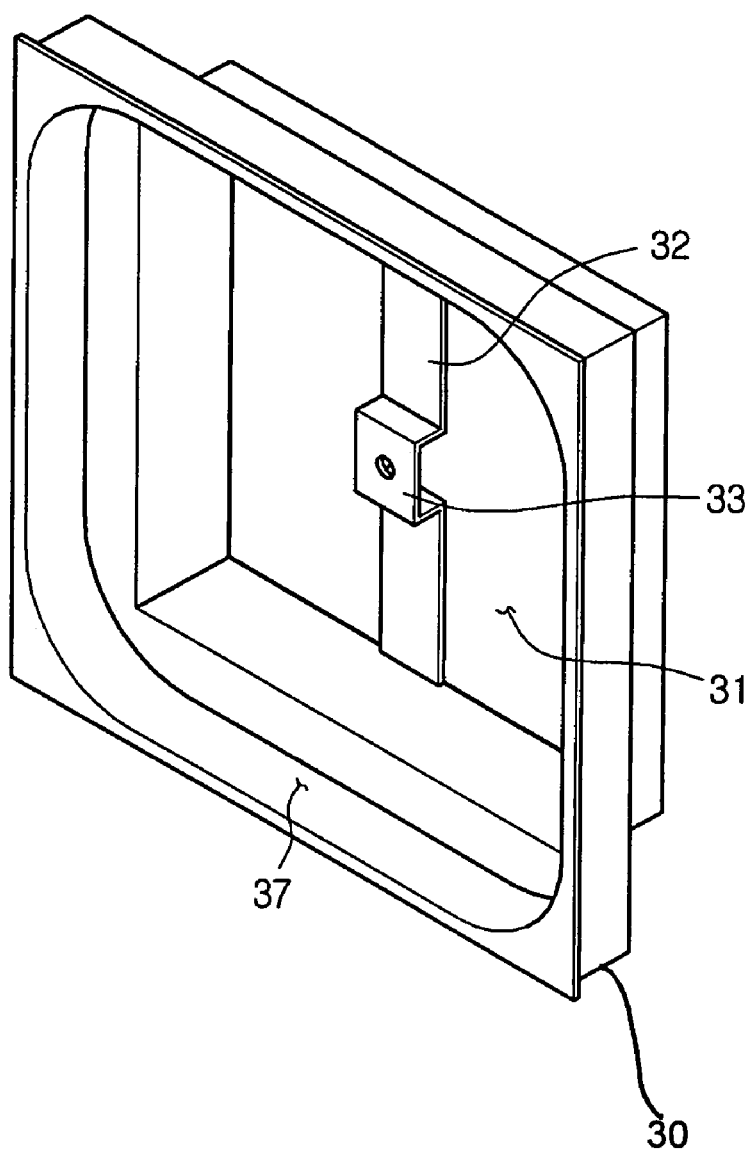
FIGS. 7 and 8 are perspective views of a supporter in an exhaust device of an image display according to an embodiment of the present invention.
Figure 8:
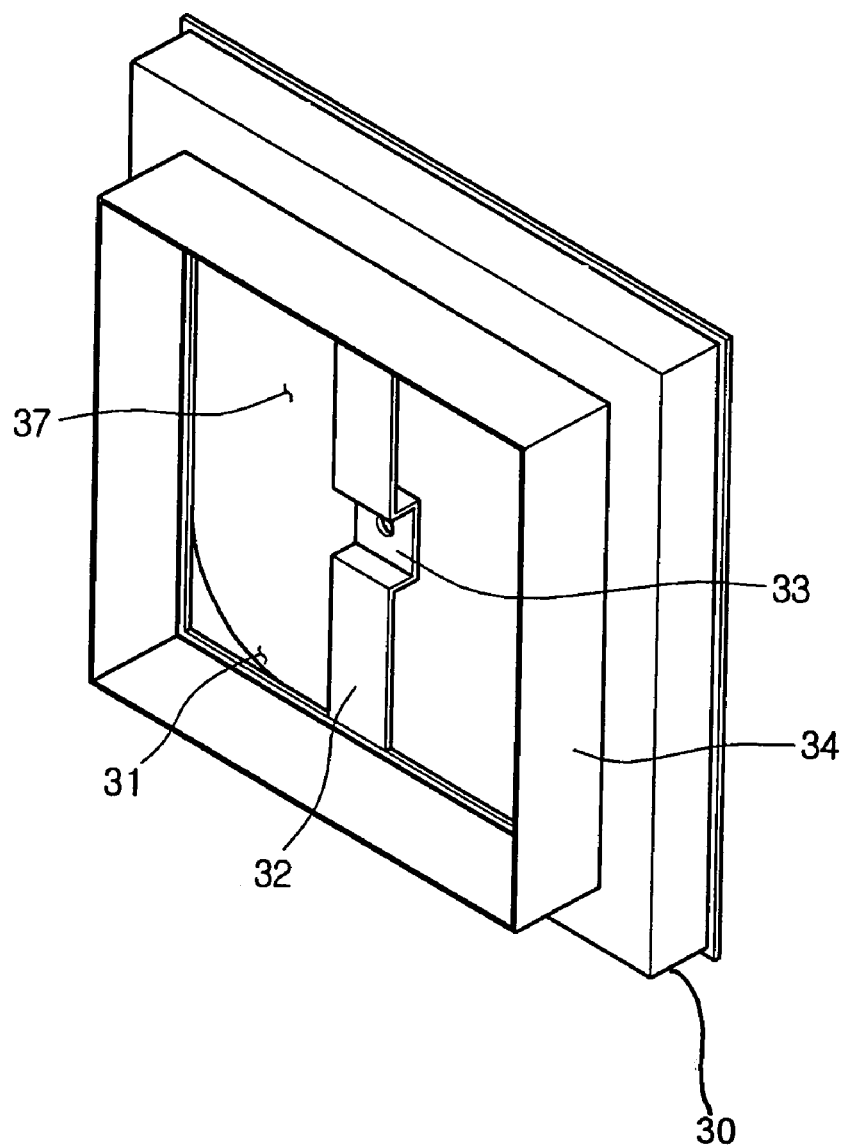

FIG. 6 is a sectional view of an exhaust device of an image display according to an embodiment of the present invention, and FIGS. 7 and 8 are perspective views of a supporter in an exhaust device of an image display according to an embodiment of the present invention.

Referring to FIGS. 4 through 8, an exhaust cover 12 is formed in the shape of a horn. When viewing the exhaust cover 12 at a front side, a center part of the exhaust cover 12 is formed in the shape of a recess, and a guide surface 124 connecting the center part to a peripheral part thereof forms a smooth curve surface.

As shown in FIG. 6, the guide surface 124 of the exhaust cover 12 is formed in such a way that its curvature radius becomes larger with an increase in a distance from the center part.

A boss 121 for connecting the exhaust cover 12 with a supporter 30 is formed at the center part of the exhaust cover 12, and has a screw hole 123 formed therein into which a screw 11 is connected.

Also, reinforcing ribs 122 may be further formed to connect the boss 121 with the exhaust cover 12 so as to reinforce the structural strength of the boss 121.

As shown in FIG. 5, the exhaust cover 12 is mounted on a rear surface of a back cover 6 in the image display.

In the meantime, as shown in FIG. 6, the exhaust device according to the present invention is constructed to include the exhaust cover 12 and the supporter 30.

A lamp 21 constituting an optical engine 2 of the image display is mounted at a lamp housing 23, and a cooling fan 8 for exhausting heat generated by the lamp 21 from the image display is installed at one side of the lamp housing 23.

Also, the supporter 30 and the exhaust cover 12 for forming an exhaust channel are formed at a position facing a cooling fan 8.

As shown in FIGS. 7 and 8, the supporter 30 has an inner opening 31 formed at an inner direction of the exhaust channel and an outer opening 31 formed at an outer direction of the exhaust channel.

That is, as shown in FIG. 6, the inner opening 31 is formed at a part facing the cooling fan 8, and the supporter 30 enables air expelled by the cooling fan to flow therethrough from the inner opening 31 to the outer opening 37.

Here, the outer opening 37 is larger in area than the inner opening 31.

Also, the supporter's part forming the outer opening 37 is connected to and supported by the back cover 6.

Also, the supporter 30A has a support rib 32 formed therein and thereby supports a connection part 33 connected with the support rib 32. The connection part 33 is connected to the exhaust cover 12 with the screw 11.

As shown in FIG. 6, an exhaust channel is formed between the exhaust cover 12 and the supporter 30, and the exhaust channel is formed in the shape of a curved surface.

This is to smoothly exhaust air expelled by the cooling fan 8. At least a part of the supporter 30 facing the exhaust cover 12 may be formed in a curved shape so as to form a curve-shaped exhaust channel.

Also, a barrier wall 34 protruded toward the inner opening 31 is form at an outer surface of the supporter 30. The barrier wall 34 is formed to cover a part of the cooling fan 8 so that air expelled by the cooling fan 8 does not leak from the exhaust channel.

An inflow opening 35 of the exhaust channel is formed larger than an outflow opening 36 of the exhaust channel, and the outflow opening 36 is formed at a more peripheral position with respect to a center of the supporter 30 when compared to the inflow opening 36.

That is, the exhaust channel is inclined toward a peripheral direction with respect to the center of the supporter 30.

This is because the guide surface 124 is extended from the inner opening 31 to the outer opening 37 and the guide surface 124's part facing the exhaust channel and located near the outer opening 37 is relatively larger in area than the guide surface 124's part facing the exhaust channel and located near the inner opening 31.

That is, an occupation area of the guide surface 124 on the exhaust channel become larger as its position is moved from the inner opening 31 to the outer opening 37.

The above-structured exhaust channel minimizes the outward emission of noises generated by the cooling fan 8, and prevents light generated by the lamp 21 from being emitted outside through the outflow opening 36.

The exhaust cover 12 may be made of a metal or plastic material, preferably a material capable of reducing a light reflection and an air flow resistance.

In some cases, a light reflection blocker may be formed on an inner surface of the exhaust cover 12 so as to minimize light reflection.

An operation and assembly process of the above-structured exhaust device will now be described.

Firstly, the supporter 30 is connected to the back cover 6, and then the connection part 33 of the supporter 30 is fixedly connected to the screw hole 123 of the boss 121 of the exhaust cover 12 with the screw 11.

Thereafter, an optical engine 2 is positioned and fixed in such a way that the cooling fan 8 equipped together with the engine 2 is faced with the center of the exhaust cover 12.

In the meantime, when a power source is applied to the image display, light is generated at the lamp 21, whereby an image is displayed a projection lens and a screen.

Also, the cooling fan 8 is driven, whereby heat generated by the lamp 21 is emitted outside through the inflow and outflow openings 35 and 36 of the supporter 30 according to an air flow.

At this time, the cooling fan 8 is partially covered with the barrier wall of the supporter 30, whereby air expelled by the cooling fan 8 is exhausted outside through the exhaust channel.

Also, light generated by the lamp 21 is blocked by the exhaust cover 12, whereby the generated light is not emitted outside of the image display.

As stated above, the present invention forms the exhaust cover 12 in the shape of a horn, thereby making it possible to smooth an exhaust air flow and to prevent the noises of the cooling fan 8 and the light of the lamp 21 from being emitted outside of the image display.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An exhaust device for an image display, comprising:
   a supporter supported by a back cover of the image display, protruded toward an inside of the image display, and having inner and outer openings formed therein forming an exhaust channel; and
   an exhaust cover supported by the supporter, making a section of the exhaust channel hollow and making the exhaust channel diverge.

2. The device according to claim 1, wherein outer measurements of the outer opening are larger than those of the inner opening and the exhaust cover covers a projected area of the inner opening of the supporter.

3. The device according to claim 1, wherein at least a part of the supporter is formed in the shape of a curved surface.

4. The device according to claim 1, wherein a center of the exhaust cover is protruded toward the inner opening of the supporter.

5. The device according to claim 1, wherein a curvature radius of an inner surface of the exhaust cover becomes larger as the inner surface's position is moved from an inside to an outside of the image display.

6. The device according to claim 1, wherein the exhaust cover is fixed to the supporter at a center thereof.

7. The device according to claim 6, wherein the exhaust cover has at least one reinforcing rib.

8. An exhaust device for an image display, comprising:
   supporter supported by a back cover of the image display, and having inner and outer openings formed therein to thereby form an exhaust channel; and
   an exhaust cover supported by the supporter and having a shape of a cone of which an outer surface forms a guide surface, the guide surface facing an inside of the image display.

9. The device according to claim 8, wherein the supporter has a barrier wall formed at an outer surface thereof and extended toward an inside of the image display, the barrier wall being more extended toward the inside than the inner opening.

10. The device according to claim 9, wherein an opening formed by the barrier wall is larger in area than the inner opening.

11. The device according to claim 9, wherein an opening formed by the barrier wall is smaller in area than the outer opening.

12. The device according to claim 8, wherein a gap between the supporter and the exhaust cover at the inner opening is larger than a gap between the supporter and the exhaust cover at the outer opening.

13. The device according to claim 8, wherein the supporter has a connection part formed therein and extended from the inner opening, the connection part being connected with the exhaust cover.

14. The device according to claim 8, wherein a curvature radius of at least a part of the guide surface becomes greater as the guide surface's position is moved from the inner opening to the outer opening.

15. The device according to claim 8, wherein an area of the guide surface increases as the guide surface extends from the inner opening to the outer opening.

16. The device according to claim 8, wherein an area of the guide surface at the outer opening is larger than an area of the inner opening.

17. The device according to claim 8, wherein the guide surface has a light reflection blocker formed thereon.

18. An exhaust device for an image display, comprising:
   a supporter having one end and the other end and a connection part, the one end forming an inner opening facing a cooling fan installed at the image display, the other end being fixed to a back cover of the image display to thereby form an outer opening, the connection part being supported by a support rib extended from the inner opening; and
   an exhaust cover connected to the supporter, an occupation area of the exhaust cover on the exhaust channel becoming larger as the exhaust cover's position is moved from the inner opening to the outer opening, so that exhaust air emitted through the inner opening to the outer opening is emitted to an peripheral part of the outer opening.

19. The device according to claim 18, wherein an occupation area of the exhaust cover at the outer opening is larger than an area of the inner opening.

20. The device according to claim 18, wherein the exhaust cover is horn-shaped.

* * * * *